United States Patent
Cho et al.

(10) Patent No.: US 9,768,715 B2
(45) Date of Patent: Sep. 19, 2017

(54) APPARATUS AND METHOD OF DRIVING A PLURALITY OF PERMANENT MAGNET SYNCHRONOUS MOTORS USING SINGLE INVERTER

(71) Applicants: SAMSUNG ELECTRONICS CO., LTD., Suwon-si, Gyeonggi-do (KR); SNU R&DB FOUNDATION, Seoul (KR)

(72) Inventors: Je Hyung Cho, Seoul (KR); Jung-Ik Ha, Seoul (KR); Alexey Bodrov, Suwon-si (KR); Youngnam Kim, Seoul (KR)

(73) Assignees: SAMSUNG ELECTRONICS CO. LTD., Suwon-si (KR); SNU R&DB FOUNDATION, Seoul (KR)

( * ) Notice: Subject to any disclaimer, the term of this patent is extended or adjusted under 35 U.S.C. 154(b) by 52 days.

(21) Appl. No.: 14/624,836

(22) Filed: Feb. 18, 2015

(65) Prior Publication Data

US 2015/0236625 A1    Aug. 20, 2015

(30) Foreign Application Priority Data

Feb. 17, 2014    (KR) .................. 10-2014-0017763

(51) Int. Cl.
  *H02P 1/40*    (2006.01)
  *H02P 6/04*    (2016.01)
  *H02K 11/00*   (2016.01)
  *H02K 15/00*   (2006.01)

(52) U.S. Cl.
  CPC ............ *H02P 6/04* (2013.01); *H02K 11/0073* (2013.01); *H02K 15/00* (2013.01); *H02P 2006/045* (2013.01); *Y10T 29/49009* (2015.01)

(58) Field of Classification Search
  CPC .......... H02P 2207/07; H02P 2207/073; H02P 2207/076; H02P 2209/01; H02P 2209/03; H02P 2209/05
  USPC ................ 318/748, 495, 523, 768, 123, 496
  See application file for complete search history.

(56) References Cited

U.S. PATENT DOCUMENTS

| 8,461,783 B2 | 6/2013 | Navarra et al. | |
| 2008/0150455 A1* | 6/2008 | Shinmura | H02K 3/28 318/85 |
| 2013/0234505 A1* | 9/2013 | Matsuda | B60K 1/02 307/9.1 |

(Continued)

OTHER PUBLICATIONS

Enrique Ledezma et al: "Dual AC-Drive System With a Reduced Switch Count", IEEE Transactions on Industry Applications, IEEE Service Center, Piscataway, NJ, US, vol. 37, No. 5, Sep. 1, 2001 (Sep. 1, 2001).

(Continued)

*Primary Examiner* — Bickey Dhakal
(74) *Attorney, Agent, or Firm* — Staas & Halsey LLP

(57) ABSTRACT

A motor driving apparatus and a method of driving a plurality of permanent magnet synchronous motor (PMSM) using a single inverter is described. The motor driving apparatus includes a single power conversion apparatus configured to supply power to a plurality of motors and a control apparatus configured to control the power conversion apparatus to adjust a phase current ratio supplied to the plurality of motors from the single power conversion apparatus according to a requirement of each of the plurality of motors.

16 Claims, 12 Drawing Sheets

(56) References Cited

U.S. PATENT DOCUMENTS

2014/0197769 A1* 7/2014 Kojiya ................ H02P 27/047
                                                        318/473

OTHER PUBLICATIONS

Moho Yaakop Net Al: "Speed performance of SVPWM direct torque control for five leg inverter served dual three-phase induction motor", Power Engineering and Optimization Conference(PEOCO), 2012 IEEE International, IEEE, Jun. 6, 2012 (Jun. 6, 2012), pp. 323-328.

Haoran Zhang et al: "A Reduced-Switch Dual-Bridge Inverter Topology for the Mitigation of Bearing Currents, EMI, and DC-Link Voltage Variations", IEEE Transactios on Industry Applications, IEEE Service Center, Piscataway, NJ, US, vol. 37, No. 5, Sep. 1, 2001 (Sep. 1, 2001).

Kawai H et al: "Characteristics of Speed Sensorless Vector Controlled Dual Induction Motor Drive Connected in Parallel Fed by a Single Inverter" IEEE Transactions on Industry Applications, IEEE Service Center, Piscataway, NJ, US, val. 40, No. 1, Jan. 1, 2004 (Jan. 1, 2004), pp. 153-161.

European Search Report dated Aug. 11, 2015 issued in corresponding European Patent Application 15155482.1.

* cited by examiner

FIG. 1
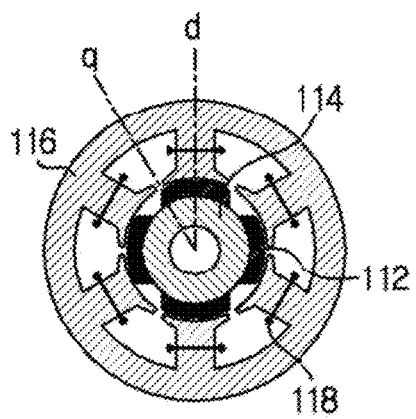
110: SURFACE MOUNTED PERMANENT MAGNET SYNCHORNOUS MOTOR (SPMSM)
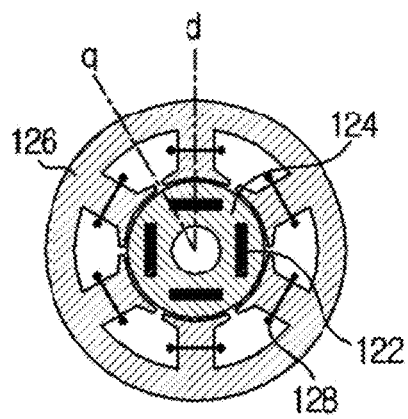
120: INTERIOR PERMANENT MAGNET SYNCHORNOUS MOTOR (IPMSM)
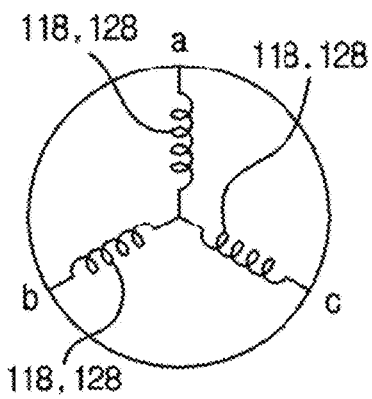
130: EQIVALENT CIRCUIT
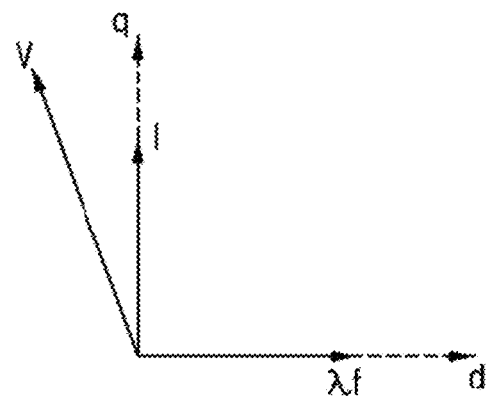
140: dq COORDNATE SYSTEM

402: DEFINITION OF NODE AND CURRENT    404: WAY OF CURRENT DISTRIBUTION

APPARATUS AND METHOD OF DRIVING A PLURALITY OF PERMANENT MAGNET SYNCHRONOUS MOTORS USING SINGLE INVERTER

CROSS-REFERENCE TO RELATED APPLICATIONS

This application claims the priority benefit of Korean Patent Application No. 10-2014-0017763, filed on Feb. 17, 2014 in the Korean Intellectual Property Office, the disclosure of which is incorporated herein by reference.

BACKGROUND

1. Field

One or more embodiments of the present disclosure relate to a method of driving a motor using an inverter, and more particularly to driving a plurality of permanent magnet synchronous motors (PMSM) using a single inverter.

2. Description of the Related Art

As for driving of a PMSM, an inverter is needed to apply a voltage level required to drive the PMSM. The voltage level of the PMSM may be variable depending on the speed and torque of the PMSM and a rotator flux position. In particular, a voltage phase may be variable according to a rotator flux position.

A vector control method is mainly used for driving the PMSM. In the vector control method, voltage is applied to place vector current at a position that is electrically forward from a rotator magnetic flux position by 90 degree. Therefore, when a plurality of PMSMs are driven, the same number of inverters is needed.

When a single inverter is used to drive a plurality of PMSMs, the plurality of the PMSMs may be connected to the inverter in parallel. Stator coils on each phase of the plurality of PMSMs may be connected to a leg of the inverter corresponding to each phase so that the same voltage is applied to each PMSM of the plurality of PMSMs. The applied voltage level may be determined according to the voltage required by the PMSM having the largest load among the plurality of PMSMs.

In the plurality of PMSMs in parallel using a single inverter, the same voltage level is applied to the plurality of PMSMs. If the plurality of PMSMs have the same parameter and load, the plurality of PMSMs may have the same performance. However, in practice, the plurality of PMSMs may have different parameters and loads due to manufacturing differences, so rotator positions may be variable in the plurality of the PMSMs. Therefore, the plurality of PMSMs each require different voltage levels. Various voltage levels, however, cannot be generated by a single inverter.

In a conventional parallel structure, a plurality of PMSMs may be driven at the same speed, and one or more of the plurality of PMSMs may be stepped out when the difference between the rotor positions is increased due to the difference in speed of the PMSMs from each other. In the conventional parallel structure, in order to confirm the current being applied to the plurality of PMSMs, at least two current sensors may be needed for each PMSM. For example, when N PMSMs may be driven by a single inverter, 2N current sensors may be needed in total.

SUMMARY

Therefore, it is an aspect of the present disclosure to provide an inverter-motor connection method and a control method thereof to drive a plurality of permanent magnet synchronous motors (PMSM) in consideration of differences in speed and rotor position of each PMSM when the plurality of PMSMs is driven with a single inverter.

It is another aspect of the present disclosure to provide an inverter-motor connection method and a control method thereof capable of reducing the number of current sensors more than the conventional method when the plurality of PMSMs is driven by using a single inverter.

Additional aspects of the present disclosure will be set forth in part in the description which follows and, in part, will be obvious from the description, or may be learned by practice of the invention.

In accordance with one aspect of the present disclosure, a motor driving apparatus includes a single power conversion apparatus configured to supply power to a plurality of motors, and a control apparatus configured to control the power conversion apparatus to adjust a phase current ratio supplied to a plurality of motors from the single power conversion apparatus according to the requirement of the plurality of motors.

The single power conversion apparatus may include a Direct Current (DC) link provided with a neutral point, and a single inverter configured to convert DC power of the DC link to Alternating Current (AC) power required by the plurality of motors.

The plurality of motors may include a first motor and a second motor. A first leg of the single inverter and a first coil of the first motor may be connected. A second leg of the single inverter and a second coil of the first motor may be connected. A third leg of the single inverter and the first coil of the second motor may be connected. The neutral point of the DC link and the second coil of the second motor may be connected. A third coil of the first motor and a third coil of the second motor may be connected.

The motor driving apparatus may further include a first current sensor configured to detect current applied through connection between the first leg of the single inverter and the first coil of the first motor, a second current sensor configured to detect current applied through connection between the second leg of the single inverter and the second coil of the first motor, and a third current sensor configured to detect current applied through connection between the third leg of the single inverter and the first coil of the second motor.

The control apparatus may be configured to generate a modified current command to control the power conversion apparatus to adjust the phase current ratio supplied to the plurality of motors from the single power conversion apparatus.

The generation of the modified current command may be modifying the current command to adjust the current ratio applied to each of the plurality of motors according to the requirement by the plurality of motors so that the amount of current required by each of the plurality of motors is applied to the each of the plurality of motors.

Voltage vA, vB, vC applied to the plurality of motors by the modified current command may be expressed as below.

$$v_A = (i^*_{c2}k_1 + i^*_{c1}k_2 + 4i^*_{a1} + 3i^*_{b1} + i^*_{a2} + 3i^*_{c2})Z \quad \text{[Formula 1]}$$

$$v_B = (-i^*_{c2}k_1 + i^*_{c1}k_2 + 3i^*_{a1} + 4i^*_{b1} + i^*_{a2} + 4i^*_{c2})Z \quad \text{[Formula 2]}$$

$$v_C = (0 \cdot k_1 + 2i^*_{c1}k_2 + i^*_{a1} + i^*_{b1} + 2i^*_{a2} + i^*_{c2})Z \quad \text{[Formula 3]}$$

In Formula 1, 2, and 3, ia1*, ib1*, ic1*, ia2*, ib2*, ic2* may represent the abc current command converted from the dq current command by coordinate transformation. k1 and k2 may represent phase current ratio applied to each of the plurality of motors, and Z may represent stator impedance of the plurality of motors.

In accordance with another aspect of the present disclosure, a motor driving apparatus includes a single power conversion apparatus configured to supply power to a plurality of motors, and a control apparatus configured to control the single power conversion apparatus to adjust the phase current ratio supplied to each of the plurality of motors from the single power conversion apparatus so that line voltage at least at one of a plurality of nodes at which the single power conversion apparatus and at least one of the plurality of motors are connected may be at a minimum.

The single power conversion apparatus may include a Direct Current (DC) link provided with a neutral point, and a single inverter configured to convert DC power of the DC link to Alternating Current (AC) power required by the plurality of motors.

The plurality of motors may include a first motor and a second motor. A first leg of the single inverter and a first coil of the first motor may be connected. A second leg of the single inverter and a second coil of the first motor may be connected. A third leg of the single inverter and the first coil of the second motor may be connected. The neutral point of the DC link and the second coil of the second motor may be connected. A third coil of the first motor and a third coil of the second motor may be connected.

The motor driving apparatus may further include a first current sensor configured to detect current applied through connection between the first leg of the single inverter and the first coil of the first motor, a second current sensor configured to detect current applied through connection between the second leg of the single inverter and the second coil of the first motor, and a third current sensor configured to detect current applied through connection between the third leg of the single inverter and the first coil of the second motor.

The control apparatus may be configured to generate a modified current command to control the power conversion unit to adjust the phase current ratio supplied to the plurality of motors from the single power conversion apparatus.

The generation of the modified current command may be modifying the current command to adjust the current ratio applied to each of the plurality of motors according to the requirement by the plurality of motors so that the amount of current required by each of the plurality of motors is applied to the each of the plurality of motors.

Voltage vA, vB, vC applied to the first leg, the second leg and the third leg by the modified current command may be expressed as below in Formula 1, Formula 2, and Formula 3.

$$v_A = (i^*_{c2}k_1 + i^*_{c1}k_2 + 4i^*_{a1} + 3i^*_{b1} + i^*_{a2} + 3i^*_{c2})Z \quad \text{[Formula 1]}$$

$$v_B = (-i^*_{c2}k_1 + i^*_{c1}k_2 + 3i^*_{a1} + 4i^*_{b1} + i^*_{a2} + 4i^*_{c2})Z \quad \text{[Formula 2]}$$

$$v_C = (0 \cdot k_1 + 2i^*_{c1}k_2 + i^*_{a1} + i^*_{b1} + 2i^*_{a2} + i^*_{c2})Z \quad \text{[Formula 3]}$$

In Formula 1, 2, and 3, ia1*, ib1*, ic1*, ia2*, ib2*, ic2* may represent the abc current command converted from the dq current command by coordinate transformation. k1 and k2 may represent phase current ratio applied to each of the plurality of motors and Z may represent stator impedance of the plurality of motors.

Voltage vA, vB, vC represented as a time function may be expressed as below in Formula 6, Formula 7, and Formula 8.

$$\begin{aligned}v_{AN} &= 4(i^*_{a1} + k_1 i^*_{c2})Z + 3(i^*_{b1} + (1-k_1)i^*_{c2})Z + \\ &\quad (i^*_{a2} + k_2 i^*_{c1})Z \\ &= I_1|Z_1|\cos(w_1 t + \phi_1) + (k_2 - 3)I_1|Z_1| \\ &\quad \cos(w_1 t + \phi_1 + 2\pi/3) + \\ &\quad I_2|Z_2|\cos(w_2 t + \phi_2) + (k_1 + 3)I_2|Z_2| \\ &\quad \cos(w_2 t + \phi_2 + 2\pi/3)\end{aligned} \quad \text{[Formula 6]}$$

$$\begin{aligned}v_{BN} &= 3(i^*_{a1} + k_1 i^*_a)Z + 4(i_{b1} + (1-k_1)i^*_{c2})Z + \\ &\quad (i^*_{a2} + k_2 i^*_{c1})Z \\ &= I_1|Z_1|\cos(w_1 t + \phi_1 - 2\pi/3) + \\ &\quad (k_2 - 3)I_1|Z_1|\cos(w_1 t + \phi_1 + 2\pi/3) + \\ &\quad I_2|Z_2|\cos(w_2 t + \phi_2) + (4 - k_1)I_2|Z_2| \\ &\quad \cos(w_2 t + \phi_2 + 2\pi/3)\end{aligned} \quad \text{[Formula 7]}$$

$$\begin{aligned}v_{CN} &= (i^*_{a1} + k_1 i^*_{c2})Z + (i^*_{b1} + (1-k_1)i^*_{c2})Z + \\ &\quad 2(i^*_{a2} + k_2 i^*_{c1})Z \\ &= (2k_2 - 1)I_1|Z_1|\cos(w_1 t + \phi_1 + 2\pi/3) + \\ &\quad I_2|Z_2|\cos(w_2 t + \phi_2) - I_2|Z_2|\cos \\ &\quad (w_2 t + \phi_2 - 2\pi/3)\end{aligned} \quad \text{[Formula 8]}$$

In formula 6, 7 and 8, Z may represent stator impedance of the plurality of motors. |Z| may represent the size of Z, and φ may represent Phase of Z.

The power conversion apparatus includes the DC link configured to supply power to the first motor and the second motor, and the single inverter wherein the first leg of the single inverter and the first coil of the first motor may be connected, the second leg of the single inverter and the second coil of the first motor may be connected, the third leg of the single inverter and the first coil of the second motor may be connected, the neutral point of the DC link and the second coil of the second motor may be connected, and the third coil of the first coil and the third coil of the second motor may be connected.

A connection method configured to connect the power conversion apparatus, to the first motor and the second motor to supply power from the power conversion apparatus provided with the DC link and the single inverter to the first motor and the second motor includes connecting the first leg of the single inverter to the first coil of the first motor, connecting the second leg of the single inverter to the second coil of the first motor, connecting the third leg of the single inverter to the first coil of the second motor, connecting the neutral point of the DC link to the second coil of the second motor, and connecting the third coil of the first coil to the third coil of the second motor.

The connection method may include detecting current applied through connection between the first leg of the single inverter and the first coil of the first motor by the first current sensor, detecting current applied through connection between the second leg of the single inverter and the second coil of the first motor by the second current sensor, and detecting current applied through connection between the third leg of the single inverter and the first coil of the second motor by the third current sensor.

A motor driving method may include generating AC power by the single power conversion apparatus, controlling the power conversion apparatus to adjust the phase current ratio supplied from the single power conversion apparatus to each of the plurality of motors according to the requirement of each of the plurality of motors which are driven by receiving AC power from the power conversion apparatus.

A motor driving method may include generating AC power by the single power conversion apparatus, controlling the power conversion apparatus to adjust the phase current ratio supplied from the single power conversion apparatus so that line voltage at least at one of the plurality of nodes, at which the single power conversion apparatus and at least one of the plurality of motors are connected, may be at a minimum.

Therefore, it is an aspect of the present disclosure to provide an inverter-motor connection method and a control method thereof to drive a plurality of permanent magnet synchronous motors (PMSM) in consideration of differences in speed and each rotor position of each when the plurality of PMSM is driven by using a single inverter.

It is another aspect of the present disclosure to provide an inverter-motor connection method and a control method thereof capable of reducing the number of current sensors more than the conventional method when the plurality of PMSM is driven by using a single inverter

BRIEF DESCRIPTION OF THE DRAWINGS

The patent or application file contains at least one drawing executed in color. Copies of this patent or patent application publication with color drawings will be provided by the Office upon request and payment of the necessary fee. These and/or other aspects of the disclosure will become apparent and more readily appreciated from the following description of embodiments, taken in conjunction with the accompanying drawings of which:

FIG. 1 is a view illustrating a permanent magnet synchronous motor (PMSM) in accordance with one embodiment of the present disclosure;

DETAILED DESCRIPTION

Figure 2:
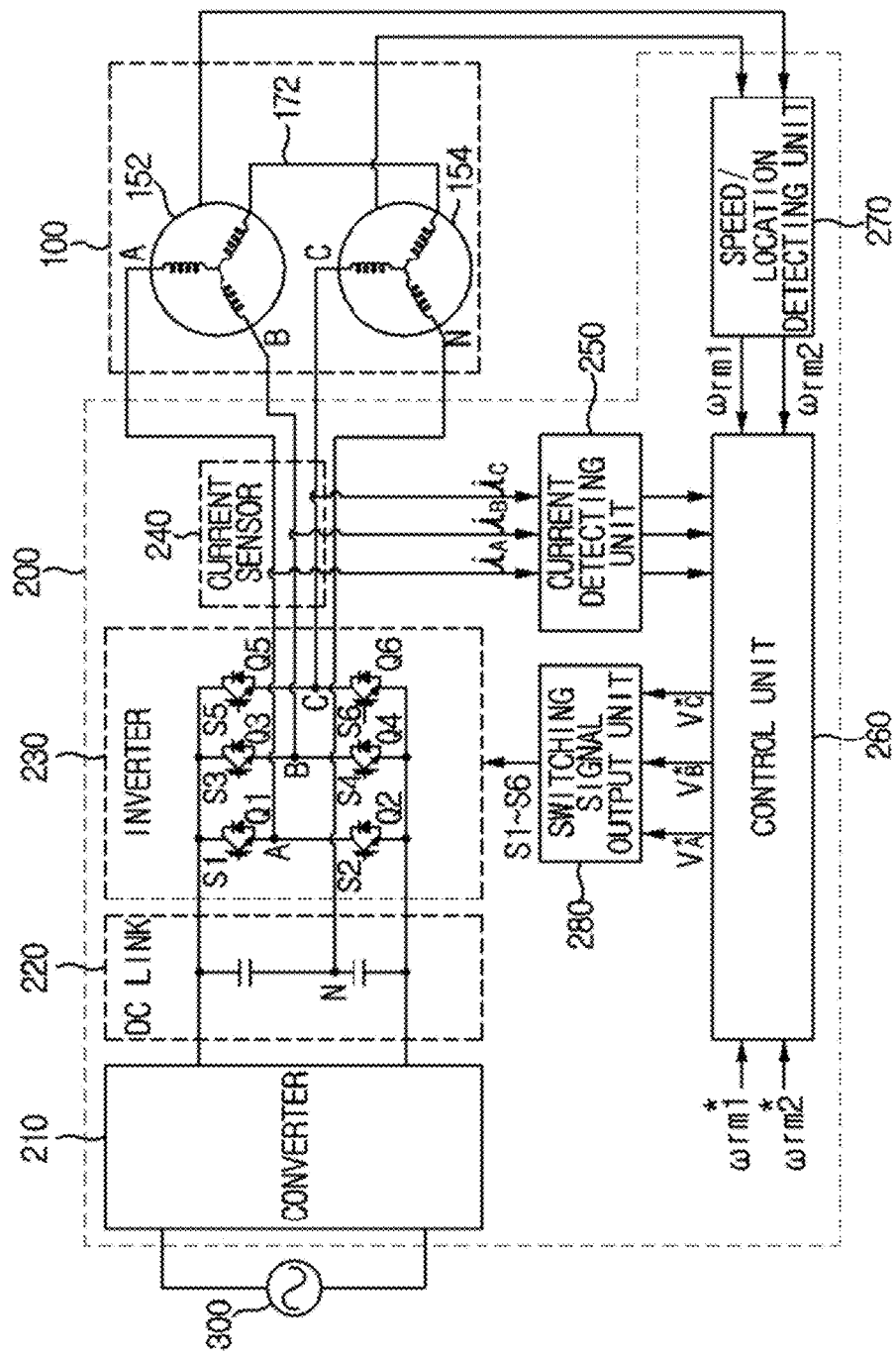
FIG. 2 is a view illustrating a motor driving apparatus in accordance with one embodiment of the present disclosure.

Reference will now be made in detail to embodiments of the present disclosure, examples of which are illustrated in the accompanying drawings, wherein like reference numerals refer to like components throughout.

FIG. 1 is a view illustrating a permanent magnet synchronous motor (PMSM) in accordance with one embodiment of the present disclosure. As illustrated in FIG. 1, reference number 110 is referred to as Surface mounted permanent magnet synchronous motor (SPMSM) and reference number 120 is referred to as Interior permanent magnet synchronous motor (IPMSM). Reference number 130 is an equivalent circuit of SPMSM 110 and IPMSM 120, and reference 140 is a view illustrating the relation between a rotor flux and current vector (I) and voltage vector (V) in a Synchronous-Reference-Frame.

As for the structure of the SPMSM 110, the permanent magnets 112 are mounted to the surface of the rotor 114 and a stator 116 is installed around the permanent magnet 112 and the rotor 114 with a gap therebetween. Coils 118 are wound around the stator 116. Therefore, when current is applied to the coil 118, the rotor 114 is rotated by force applied in a certain direction according to Fleming's left-hand rule.

As for the structure of the IPMSM 120, the permanent magnets 122 are inserted into the inside of the rotor 124 and a stator 126 is installed around the permanent magnet 122 and the rotor 124 with a gap therebetween. Coils 128 are wound around the stator 126. Therefore, when current is applied to the coil 128, the rotor 124 is rotated by force applied in a certain direction according to Fleming's left-hand rule.

In the equivalent circuit 130, a three-phase current (a, b, c) is applied to the coils 118 and 128. As mentioned above, the three-phase current is applied to a magnetic field of the permanent magnet 112 and 122 to generate torque so that the rotators 114 and 124 are rotated.

In the dq coordinate system 140, direct axis (d-axis) represents an axis generating magnetic flux of the PMSM 100, and becomes a reference axis in vector control of the PMSM 100. Quadrature axis (q-axis) represents an axis generating torque in vector control and is perpendicular to the d-axis, which is the reference axis. In FIG. 1, the d-axis and the q-axis marked on the SPMSM 120 and the IPMSM, may not form at a right angle in practice, but in a coordinate system, the d-axis and the q-axis may form at a right angle.

FIG. 2 is a view illustrating a motor driving apparatus in accordance with an embodiment of the present disclosure. A motor driving apparatus 200 is configured to apply a determined current and voltage so that the PMSM 100 is driven at a desired speed and torque. The motor driving apparatus 200 receives power from an external power source, such as a commercial alternating current power, to supply power to the motor 100 after converting current, voltage and phase. At the motor driving apparatus 200, the SPMSM 110 or the IPMSM 120 may be provided power in plural. That is, in an embodiment, the motor driving apparatus 200 may provide power to the SPMSM 110 or the IPMSM 120, or to both motors concurrently. The motor driving apparatus 200 according to the embodiment of the present disclosure, is configured to simultaneously drive a plurality of motors consisting of the PMSM 100 by a single inverter (refer to 230 in FIG. 2). The plurality of motors consisting of the PMSM may be divided into a first PMSM 152 and a second PMSM 154.

As illustrated in FIG. 2, the motor driving apparatus 200 may include, for example, a converter 210, a direct current (DC) link 220, an inverter 230, a current sensor 240, a current detecting unit 250, a control unit 260, a speed/location detecting unit 270, and a switching signal output unit 280.

The converter 210 is configured to rectify and smooth AC power supplied from the external power supply 300. For example, the converter 210 may be comprised of a diode half-wave rectifier circuit, and may smooth sinusoidal alternating current by half wave rectification.

The DC link 220 may include a plurality of capacitors, such as two capacitors, which are connected in series. The DC link 220 may receive current smoothed from the converter 210 and store current smoothed in DC voltage. In a capacitor series circuit of the DC link 220, a node where two capacitors are connected is Neutral point (N). In the DC link 220, a plurality of capacitors connected in series are charged so that a voltage level, which corresponds to capacitance of the plurality of capacitors, are generated at both end portions of the plurality of capacitors connected in series.

The inverter 230 converts power stored in the capacitor series circuit of the DC link 220 so as to have current, voltage and phase in the form required by the PMSM 100. Power having current, voltage and phase changed by the inverter 230 is applied to coils of the PMSM 100, refer to 118 and 128 in FIG. 1, and is used to drive the PMSM 100. The inverter 230 may include a six-bridge, two-level, three-leg, voltage source inverter including a plurality of switching elements Q1,Q2,Q3,Q4,Q5, and Q6. The plurality of switching elements Q1, Q2, Q3, Q4, Q5, and Q6 may be provided with a freewheeling diode. In the inverter 230, a pair of switching elements which are connected in series is referred to as a leg. As illustrated in FIG. 2, the inverter 230 may include three legs, and nodes where switching elements are connected are referred to as leg A, leg B and leg C. Therefore, four different power levels supplied from the Neutral point (N) of the DC link 220 and three legs A, B and C of the inverter 230 are applied to the PMSM 100.

The relation between the inverter 230 and the PMSM 100 is as below. One coil on one phase among three-phases in the first PMSM 152 is connected to one coil on one phase among three-phases in the second PMSM 154 (refer to 172 in FIG. 2). The other two coils in the first PMSM 152 are connected to leg A and leg B of the inverter 230, respectively. The other two coils in the second PMSM 154 are connected to leg c of the inverter 230 and the Neutral point (N) of the DC link 220, respectively The current sensor 240 may be provided to detect current applied from the inverter 230 to the PMSM 100. The current sensor 240 may be installed on the current path between three legs A, B and C, and the PMSM 100. Therefore, the number of current sensors 240 may be same as the number of legs A, B, and C.

Referring again to FIG. 2, motor driving apparatus 200 may include the current sensor 240, which may be comprised of a three unit current sensor. A hall sensor may be employed as the current sensor 240.

The current detecting unit 250 may generate information iA, iB, iC, which represents current detected by the current sensor 240, and may be provided for the control unit 260.

The speed/location detecting unit 270 may measure and calculate the rotational speed of the PMSM 100 by a location sensor provided in the PMSM 100. The rotational speed of the PMSM 100 (ωrm1 and ωrm2) detected by the speed/location detecting unit 270 may be provided for the control unit 260. ωrm1 is information of rotational speed of the first PMSM 152, and ωrm2 is information of rotational speed of the second PMSM 154.

The control unit 260, as mentioned above, may receive iA, iB, iC, which is information about current applied from the inverter 230 to the PMSM 100, from the current detecting unit 250. In addition, the control unit 260 may receive ωrm1 and ωrm2, which are information about the rotational speed of the PMSM 100 from the speed/location detecting unit 270. A control unit, such as a system control unit, may receive speed command ωrm1* and ωrm2*, and location information by users. By using rotational speed information ωrm1 and ωrm2, the current information iA, iB, iC, and speed command ωrm1* and ωrm2*, the control unit 260 may generate leg voltage commands vA*, vB*, vC*, which are required to drive the PMSM 100 at a necessary speed according to speed command ωrm1* and ωrm2*, and deliver the leg voltage commands vA*, vB*, vC* to the switching signal output 280.

The switching signal output 280 may generate switching signals S1, S2, S3, S4, S5, S6 to turn on/off the plurality of the switching elements Q1, Q2, Q3, Q4, Q5, Q6 according to the leg voltage commands vA*, vB*, vC* delivered from the control unit 260. The plurality of the switching elements Q1, Q2, Q3, Q4, Q5, Q6 of the inverter 230 are turned on or off by the switching signals S1, S2, S3, S4, S5, S6 so that the voltage level according to the leg voltage commands vA*, vB*, vC* may be applied to the PMSM 100.

Figure 3:
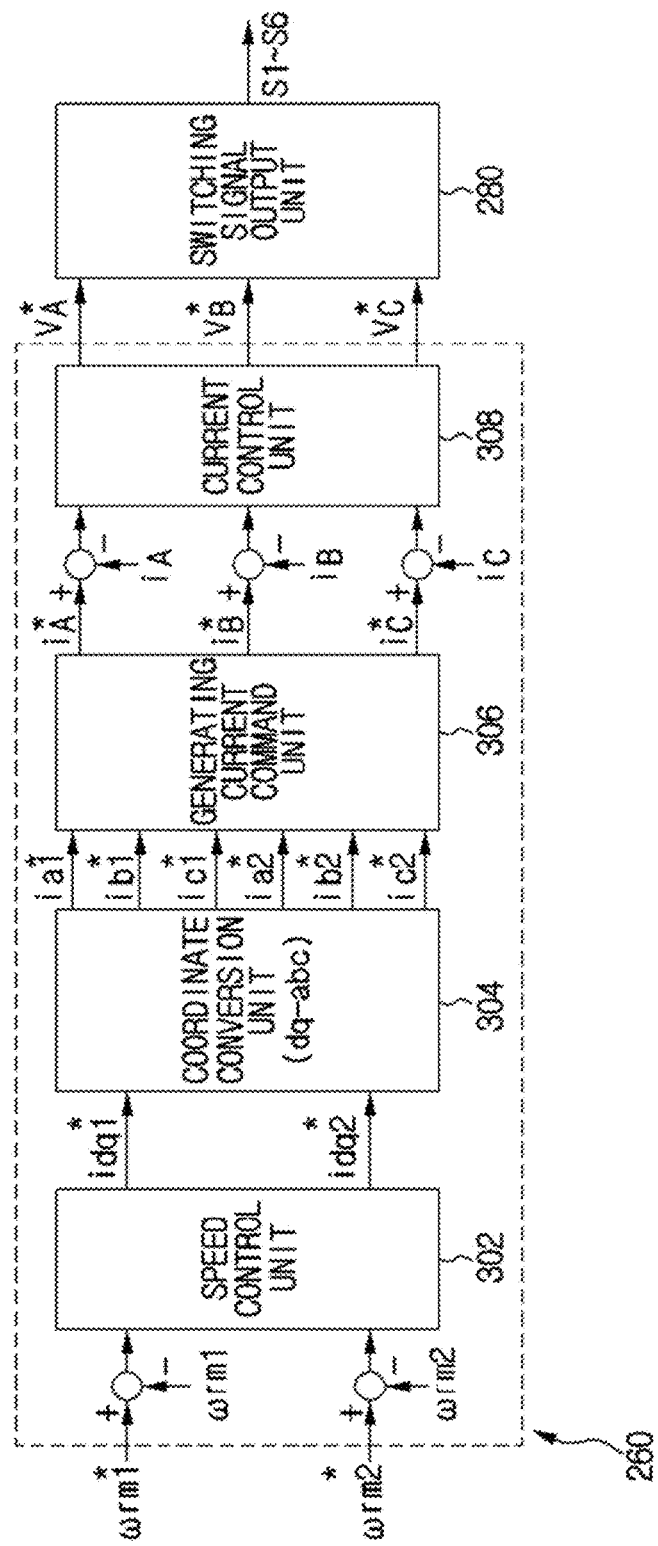
FIG. 3 is a view illustrating a configuration of a control unit of FIG. 2.

FIG. 3 is a view illustrating a configuration of a control unit 260 of FIG. 2. As illustrated in FIG. 3, the control unit 260 may include, for example, a speed control unit 302, a coordinate conversion unit 304, a generating current command unit 306, and a current control unit 308. The control unit 260, the speed control unit 302, the coordinate conversion unit 304, the generating current command unit 306, and the current control unit 308 may be provided as an individual hardware module to perform a predetermined operation, or may be provided in the form of integrated control logic to perform calculations.

A difference between speed command ωrm1* and ωrm2* delivered from the higher control unit, such as the system control unit, or from users, and the rotational speed information ωrm1 and ωrm2 delivered from the speed/location detecting unit 370 may be input to the speed control unit 302 The speed control unit 302 may generate dq current commands idq1* and idq2*, for the first PMSM 152 and the second PMSM 154, which is the current command at the d-axis and the q-axis, by the difference between speed command ωrm1* and ωrm2 and the rotational speed information ωrm1 and ωrm2. The d-axis and the q-axis are mentioned above with reference to 140 of FIG. 1.

The dq current commands idq1* and idq2* generated by the speed control unit 302 may be input to the coordinate conversion unit 304. The coordinate conversion unit 304 may convert dq current commands idq1* and idq2* to the abc coordinate system. That is, the coordinate conversion unit 304 may convert dq current commands idq1* and idq2* to abc current command, ia1*, ib1*, ic1*, ia2*, ib2*, ic2*.

The abc current command, ia1*, ib1*, ic1*, ia2*, ib2*, ic2* generated by the coordinate conversion unit 304 may be input to the generating current command unit 306. The generating current command unit 306 may generate a modified current command iA*, iB*, iC* from the abc current command, ia1*, ib1*, ic1*, ia2*, ib2*, ic2*. The modification of the abc current command, ia1*, ib1*, ic1*, ia2*, ib2*, ic2* may be that the current ratio applied to each of the plurality of the PMSM 152 and 154 are adjusted to the size required by the respective plurality of the PMSM 152 and 154 so that the current size required by the respective plurality of the PMSM 152 and 154 may be applied to the respective plurality of the PMSM 152 and 154. The voltage level and current size required by the plurality of the PMSM 152 and 154 may be variable according to each of the speed and torque, and the rotor flux position of the plurality of the PMSM 152 and 154. In particular, the voltage phase may be variable according to the rotor flux position.

A difference between leg current command iA*, iB*, iC* generated in the generating current command 306 and the current information iA, iB, iC generated in the current detecting unit 250 may be input to the current control unit 308. The current control unit 308 may generate the leg voltage commands vA*, vB*, vC* using the difference between leg current command iA*, iB*, iC* and the current information iA, iB, iC. The current control unit 308 may use the Proportional-Integral (PI) control method. As mentioned in the description of FIG. 2, the leg voltage commands vA*, vB*, vC* generated in the control unit 260 may be delivered to the switching signal output unit 280. The switching signal output 280 may generate switching signals S1, S2, S3, S4, S5, S6 to turn on or off the plurality of the switching elements Q1, Q2, Q3, Q4, Q5, Q6 according to the leg voltage commands vA*, vB*, vC* delivered from the control unit 260. The motor driving apparatus 200 according to the embodiment of the present disclosure, may control the respective PMSM 152 and 154, separately by using a single inverter to control voltage applied to the plurality of the PMSM 152 and 154 so that the plurality of the PMSM 152 and 154 may be driven at rotational speed different from each other without being stepped out. The generating current command 250 may generate the modified leg current command iA*, iB*, iC* by modifying the abc current command ia1*, ib1*, ic1*, ia2*, ib2*, ic2*, and the method of generating the modified leg current command iA*, iB*, iC* is as below.

Figure 4:
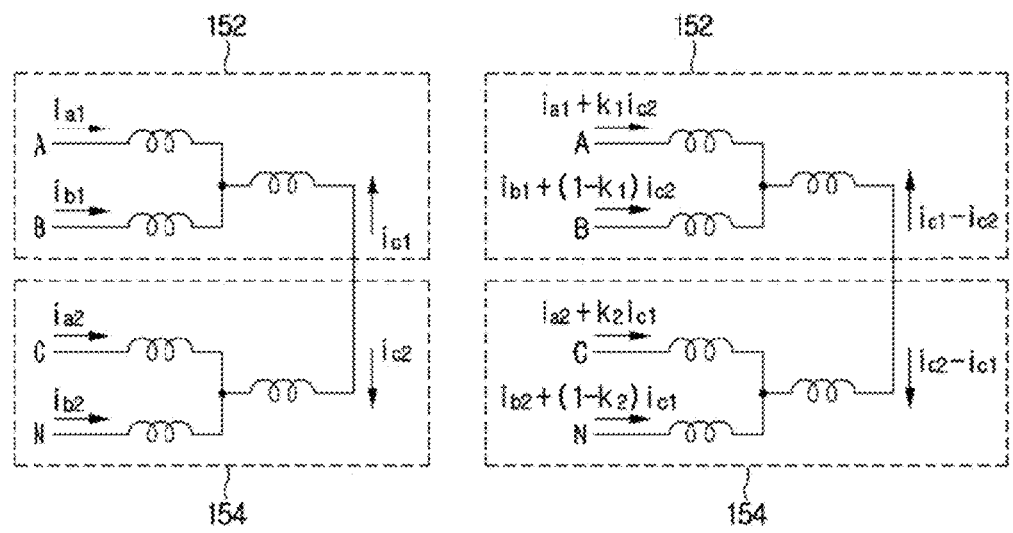
FIG. 4 is an equivalent circuit illustrating a coil connecting status of a first PMSM and a second PMSM of FIG. 2.

FIG. 4 is an equivalent circuit illustrating a coil connecting status of a first PMSM 152 and a second PMSM 154 of FIG. 2. As illustrated in FIG. 4, an equivalent circuit indicated by reference number 402 represents the definition of the node and the current and an equivalent circuit indicated by reference number 404 represents the way of current distribution. In FIG. 4, capital letters A, B, C, N represent legs A, B, C of the inverter 230 and the neutral point (N) of the DC link 220. Letters in lowercase represent three-phase a, b, c of the first PMSM 152 and the second PMSM 154.

As illustrated by 402 in FIG. 4, one phase coil among the three-phase coils of the first PMSM 152 and one phase coil among the three-phase coil of the second PMSM 154 are connected to each other and current ic1 and ic2 flows in each of the coils. The other two coils of the first PMSM 152 are connected to leg A and leg B of the inverter 230 and current ia1 and ib1 flows in each of the coils. The other two coils of the second PMSM 154 are connected to leg C of the inverter 230 and the neutral point (N) of the DC link 220, and current ia2 and ib2 flows in each of the coils.

c-phase current ic1 and ic2 of the first PMSM 152 and the second PMSM 154 may be divided and provided to a-phase and b-phase. When k1 and k2 represent a share ratio in which a-phase and b-phase share c-phase current at the first PMSM 152 and the second PMSM 152, as illustrated 404 in FIG. 4, divided current may flow. The generating current command unit 306 may modify the abc current command ia1*, ib1*, ic1*, ia2*, ib2*, ic2* generated by the coordinate conversion unit 304 as illustrated by 404 in FIG. 4. The value of k1 and k2 may be determined so that line voltage vAN, vBN, vCN of the nodes to which the inverter 230 and the PMSM 100 are connected is at a minimum.

Figure 5:
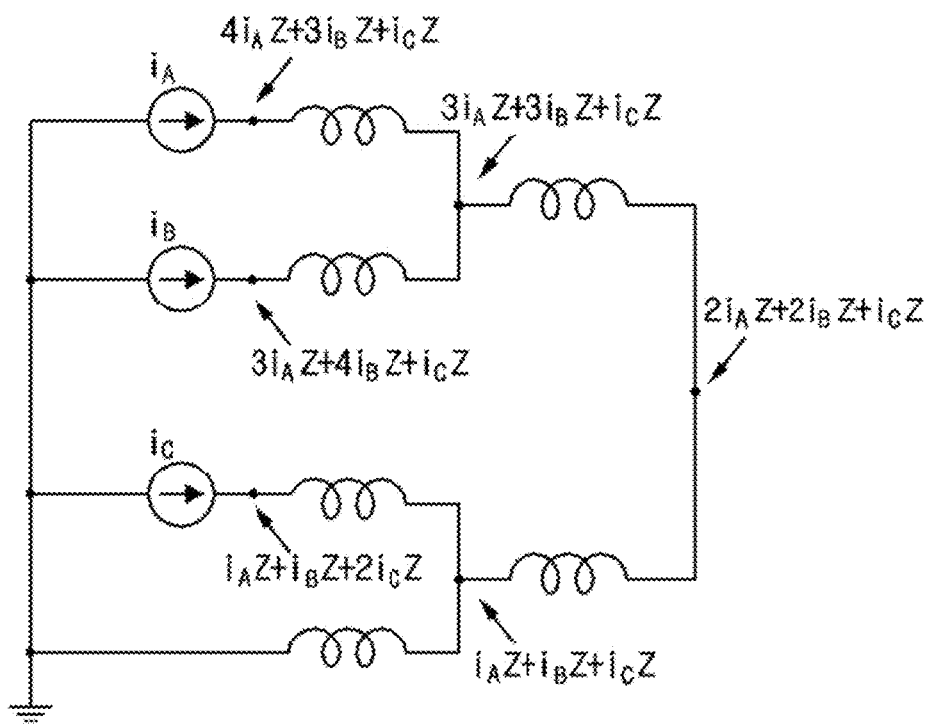
FIG. 5 is a view illustrating voltages of each node according to the current flowing on the stator coil to calculate k1 and k2 which is the share ratio of a-phase and b-phase sharing c-phase current.

FIG. 5 is a view illustrating voltages of each node according to the current flowing in the stator coil to calculate k1 and k2 which is the share ratio of a-phase and b-phase sharing c-phase current. In FIG. 5, iA, iB, iC represent current provided from leg A, B, C, respectively, of the inverter 230 toward the PMSM 100, and Z represents impedance of the stator 116 and 126. Voltage of legs A, B, C where the inverter 230 and the PMSM 100 are connected to each other is expressed as formula 1, 2, or 3, respectively.

$$v_A = (i^*_{c2}k_1 + i^*_{c1}k_2 + 4i^*_{a1} + 3i^*_{b1} + i^*_{a2} + 3i^*_{c2})Z \quad \text{[Formula 1]}$$

$$v_B = (-i^*_{c2}k_1 + i^*_{c1}k_2 + 3i^*_{a1} + 4i^*_{b1} + i^*_{a2} + 4i^*_{c2})Z \quad \text{[Formula 2]}$$

$$v_C = (0 \cdot k_1 + 2i^*_{c1}k_2 + i^*_{a1} + i^*_{b1} + 2i^*_{a2} + i^*_{c2})Z \quad \text{[Formula 3]}$$

As shown in each of Formula 1, 2 and 3, ia1*, ib1*, ic1*, ia2*, ib2*, ic2* represent the abc current command generated by the coordinate conversion unit 304 and each of the three-phases are balanced. Formula 1, 2 and 3 in a time function may be expressed as Formula 4 and 5. In Formula 4 and 5, the amount of current I1 and I2 are determined by torque of the PMSM 100, and rotating frequency ω1 and ω2 are determined by the rotational speed of the PMSM 100.

$$i^*_{a1} = I_1 \cos \omega_1 t \quad \text{[Formula 4]}$$
$$i^*_{b1} = I_1 \cos\left(w_1 t - \frac{2\pi}{3}\right)$$
$$i^*_{c1} = I_1 \cos\left(w_1 t + \frac{2\pi}{3}\right)$$

$$i^*_{a2} = I_2 \cos \omega_2 t \quad \text{[Formula 5]}$$
$$i^*_{b2} = I_2 \cos\left(w_2 t - \frac{2\pi}{3}\right)$$
$$i^*_{c2} = I_2 \cos\left(w_2 t + \frac{2\pi}{3}\right)$$

When formula 4 and 5 is substituted to formula 1, 2 and 3, formula 6, 7 and 8 may be obtained.

$$\begin{aligned} v_{AN} &= 4(i^*_{a1} + k_1 i^*_{c2})Z + 3(i^*_{b1} + (1-k_1)i^*_{c2})Z + \\ &\quad (i^*_{a2} + k_2 i^*_{c1})Z \\ &= I_1|Z_1|\cos(w_1 t + \phi_1) + (k_2 - 3)I_1|Z_1| \\ &\quad \cos(w_1 t + \phi_1 + 2\pi/3) + \\ &\quad I_2|Z_2|\cos(w_2 t + \phi_2) + (k_2 + 3)I_2|Z_2| \\ &\quad \cos(w_2 t + \phi_2 + 2\pi/3) \end{aligned} \quad \text{[Formula 6]}$$

$$\begin{aligned} v_{BN} &= 3(i^*_{a1} + k_1 i^*_a)Z + 4(i_{b1} + (1-k_1)i^*_{c2})Z + \\ &\quad (i^*_{a2} + k_2 i^*_{c1})Z \\ &= I_1|Z_1|\cos(w_1 t + \phi_1 - 2\pi/3) + \\ &\quad (k_2 - 3)I_1|Z_1|\cos(w_1 t + \phi_1 + 2\pi/3) + \\ &\quad I_2|Z_2|\cos(w_2 t + \phi_2) + (4 - k_1)I_2|Z_2| \\ &\quad \cos(w_2 t + \phi_2 + 2\pi/3) \end{aligned} \quad \text{[Formula 7]}$$

$$\begin{aligned} v_{CN} &= (i^*_{a1} + k_1 i^*_{c2})Z + (i^*_{b1} + (1-k_1)i^*_{c2})Z + \\ &\quad 2(i^*_{a2} + k_2 i^*_{c1})Z \\ &= (2k_2 - 1)I_1|Z_1|\cos(w_1 t + \phi_1 + 2\pi/3) + \\ &\quad I_2|Z_2|\cos(w_2 t + \phi_2) - I_2|Z_2|\cos \\ &\quad (w_2 t + \phi_2 - 2\pi/3) \end{aligned} \quad \text{[Formula 8]}$$

In formula 6, 7 and 8, Z represents impedance of the stator 116 and 126. |Z| represents the size of Z, and φ represents Phase of Z.

As illustrated by 404 in FIG. 4, when generating a current command, line voltage vAN, vBN, vCN of the node to which the inverter 230 and the PMSM 100 are connected are determined by formula 6, 7 and 8. By the connection structure of the inverter 230 and the PMSM 100, voltage of the DC link 220 is divided into the first PMSM 152 and the second PMSM 154 so that the voltage level applied to the first PMSM 152 and the second PMSM 154 is lower than in a case when driving one motor by a single inverter. Therefore, in a case when voltage of the DC link 220, that is, the DC link voltage, is limited to be a predetermined value, k1 and k2 may be predetermined in order that line voltage vAN, vBN, vCN of the node to which the inverter 230 and the PMSM 100 are connected, represented by formula 6, 7, and 8 have the smallest value so as to maximize the operational area of the PMSM 100.

Figure 6:
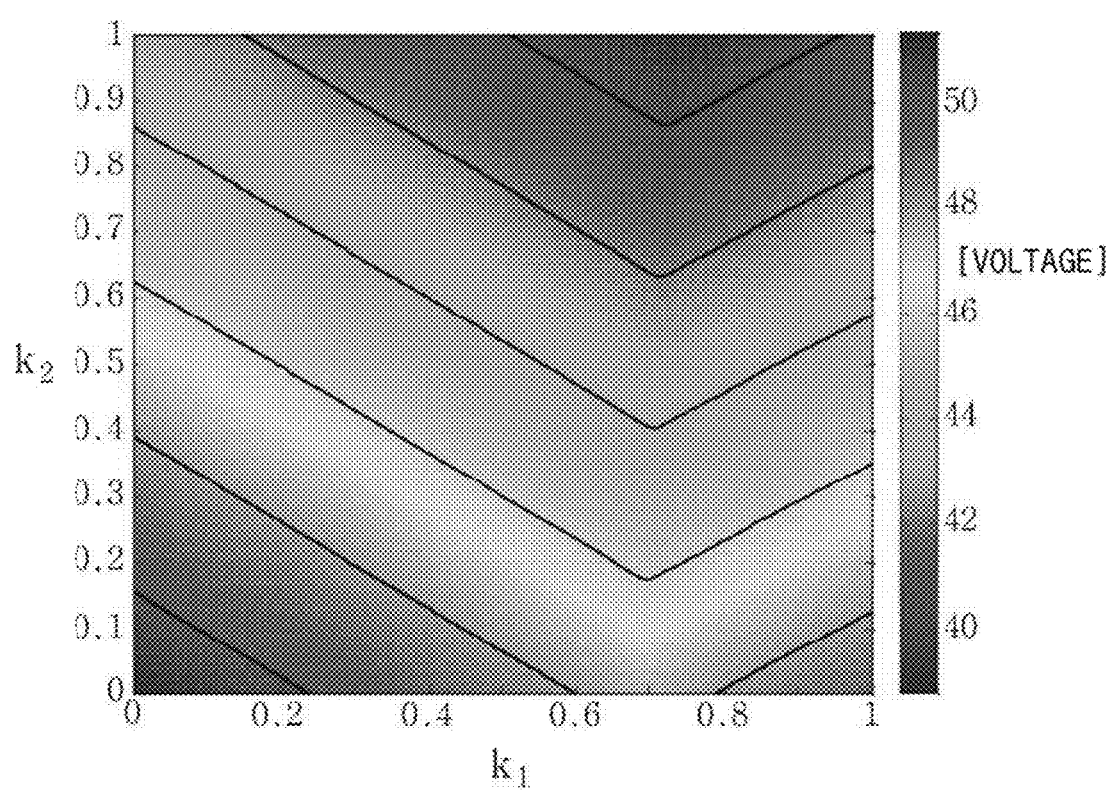
FIG. 6 is a view illustrating a maximum value of line voltages according to k1 and k2 of the motor driving apparatus in accordance with one embodiment of the present disclosure.

When k1 and k2 are determined by the method mentioned above, the PMSM 100 may be driven using only a minimal DC link voltage which meets the operating conditions of the PMSM 100, although voltage of the DC link 220, that is, the DC link voltage, is not limited as a predetermined value even if it is sufficiently large. For example, when the operating conditions of the PMSM 100 are I1=5A, I2=3A, ω1=2π*80 rad/s, ω2=2πr*60 rad/s, in terms of torque and speed, the largest line voltage among vAN, vBN, vCN according to k1 and k2 is expressed as in FIG. 6. FIG. 6 is a view illustrating a maximum value of line voltages, vAN, vBN, vCN, according to k1 and k2 of the motor driving apparatus in accordance with one embodiment of the present disclosure. FIG. 6 is obtained by changing k1 and k2 of formula 6, 7, and 8 into a two-dimensional form. FIG. 6 is represented by contour lines so that the three-dimensional value according to k1/k2 is expressed on a two-dimensional form. In a rectangular graph on the left side of FIG. 6, the lower left side represents higher voltage and the right side represents relatively lower voltage. In a vertically long rectangle graph on the right side of FIG. 6, the color-coded voltage levels according to the left side graph, is expressed in a shape of a strip. According to FIG. 6, k1 and k2 are respectively 0.62 and 1 in optimal operating conditions of I1=5A, I2=3A, ω1=2π*80 rad/s, ω2=2π*60 rad/s.

When k1 and k2 are determined by the method, as mentioned above, one of the first PMSM 152 and the second PMSM 154 may be driven while one of the first PMSM 152 and the second PMSM 154 is not driven. In formula 4 and 5, the abc current command ia1*, ib1*, ic1 ia2*, ib2*, ic2* is represented as the time function, when current of formula 4 flow on the first PMSM 152 and current of formula 5 are all zero, ic1 of the first PMSM 152 may separately flow on a-phase and b-phase of the second PMSM 154 according to k1 and k2. Current flow on a-phase and b-phase of the second PMSM 154 generates magnetic field causing vibration instead of rotation on the second PMSM 154, so that the PMSM 154 is vibrated without being rotated while the first PMSM 152 is rotated. By determining k1 and k2 in accordance with one embodiment of the present disclosure, some of the plurality of the PMSM 152 and 154 may be driven and the other of the plurality of the PMSM 152 and 154 may not be driven.

Figure 7:
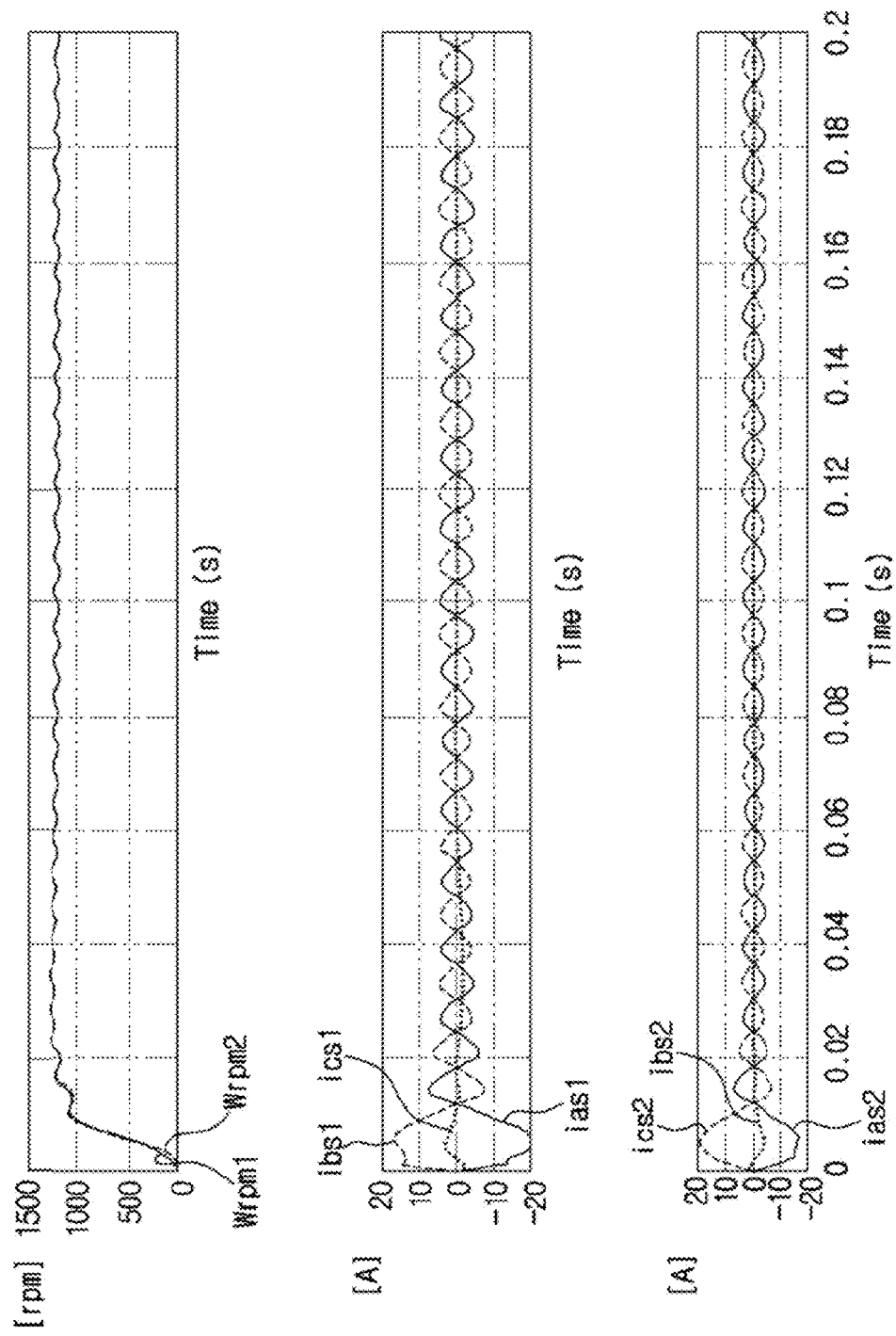
FIGS. 7, 8 and 9 are views illustrating simulation results of the motor driving apparatus in accordance with one embodiment of the present disclosure.
Figure 8:
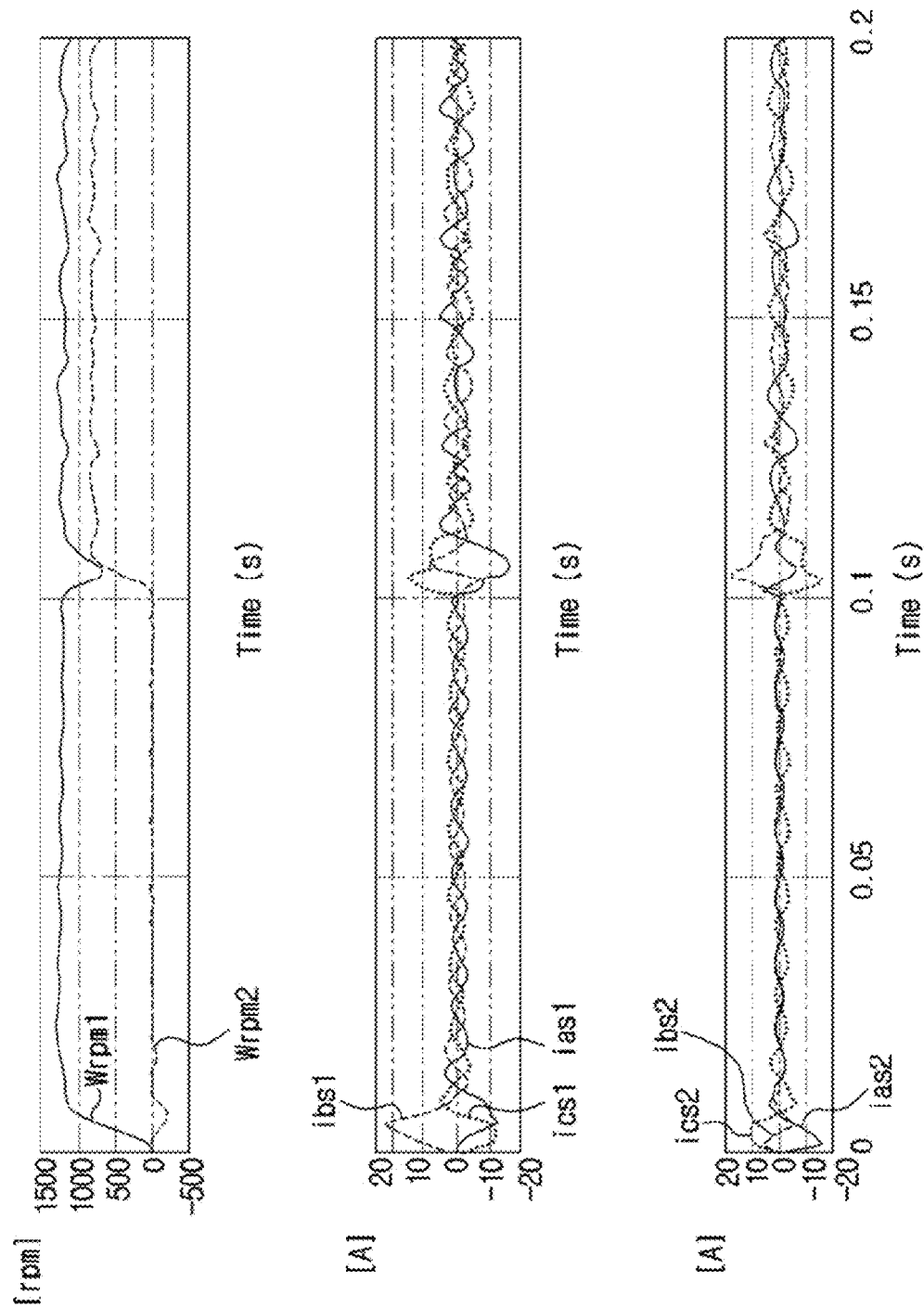
Figure 9:
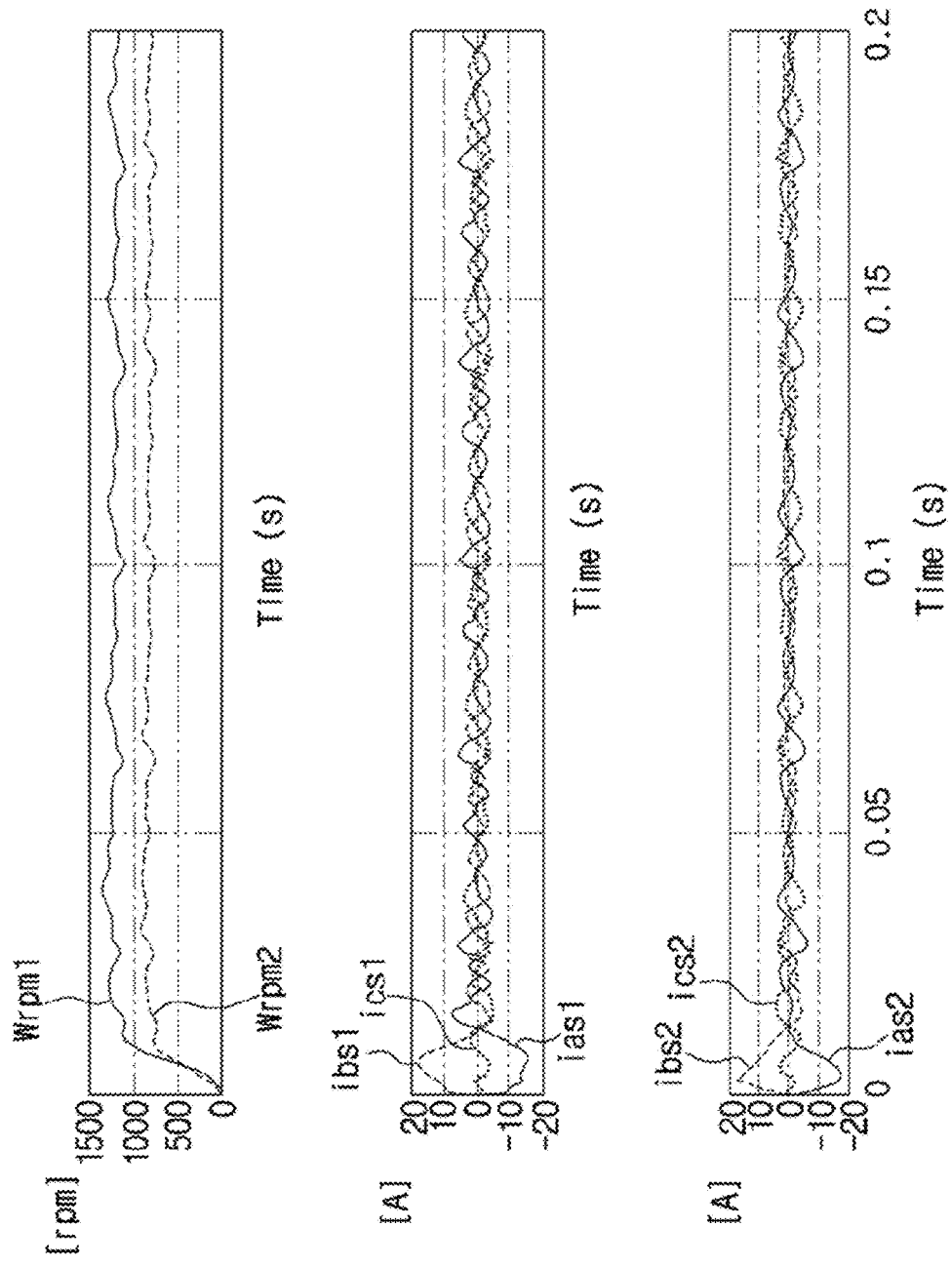

FIGS. 7, 8 and 9 are views illustrating simulation results of the motor driving apparatus in accordance with an embodiment of the present disclosure. Each of the simulation conditions in FIGS. 7, 8 and 9 are as follows.

|        | Speed(rpm) | | Load (Nm) | | Current ratio | |
|--------|---------|---------|--------|--------|------|------|
|        | Speed 1 | Speed 2 | Load 1 | Load 2 | K1   | K2   |
| FIG. 7 | 1200    | 1200    | 5      | 5      | 0.5  | 0.5  |
| FIG. 8 | 1200    | 800     | 5      | 2.5    | 0.62 | 1    |
| FIG. 9 | 1200    | 800     | 5      | 3      | 0.62 | ta1  |

FIG. 7 is a view illustrating each speed and phase current of the PMSMs, when two PMSMs are rotated at the same speed. In FIG. 7, each speed command of the two PMSM is 1200 rpm, and load torque is 5 N·m. Under this condition, values of k1 and k2 are 0.5 so that the same amount of current is applied to the two PMSMs. As the speed waveform shown in FIG. 7, the two PMSMs are determined to be rotated at the same speed. On a phase which is connected to each other, phase current of the two PMSMs is overlapped and close to zero and the other two phase currents flow with the same ratio, that is, k1 and k2 are 0.5.

FIG. 8 is a view illustrating each speed and phase current of two PMSMs when the driving speed and starting time are different from each other. Each speed command of the two PMSMs is 1200 rpm and 800 rpm, and the load torque is 5 N·m. Under this condition, values of k1 and k2 are 0.62 and 1 respectively. When the second motor is driven, at approximately 0.15, referring to FIG. 8, the speed of the first motor Wrpm1 is momentarily reduced, but is restored to the level of 1200 rpm and follows the speed command of 1200 rpm. In FIG. 8, as shown in the waveform between 0 s and 0.1 s, in a case when one PMSM is stopped, that is, Wrpm2=0, the other PMSM may be driven, Wrpm1. Two PMSM may be driven at different speed from each other so that even when each rotator position of the two PMSMs are different from each other the two PMSMs may be controlled.

FIG. 9 is a view illustrating each speed and phase current of two PMSMs when the driving speed and the load torque are different from each other. Each speed command of the two PMSM is 1200 rpm and 800 rpm, and the load torque is 5 N·m and 3 N·m. As illustrated in FIG. 9, although the driving speed and the load torque of one PMSM and the driving speed and the load torque of another PMSM are different from each other, the two PMSMs may be driven at predetermined speed with a predetermined load torque.

Figure 10:
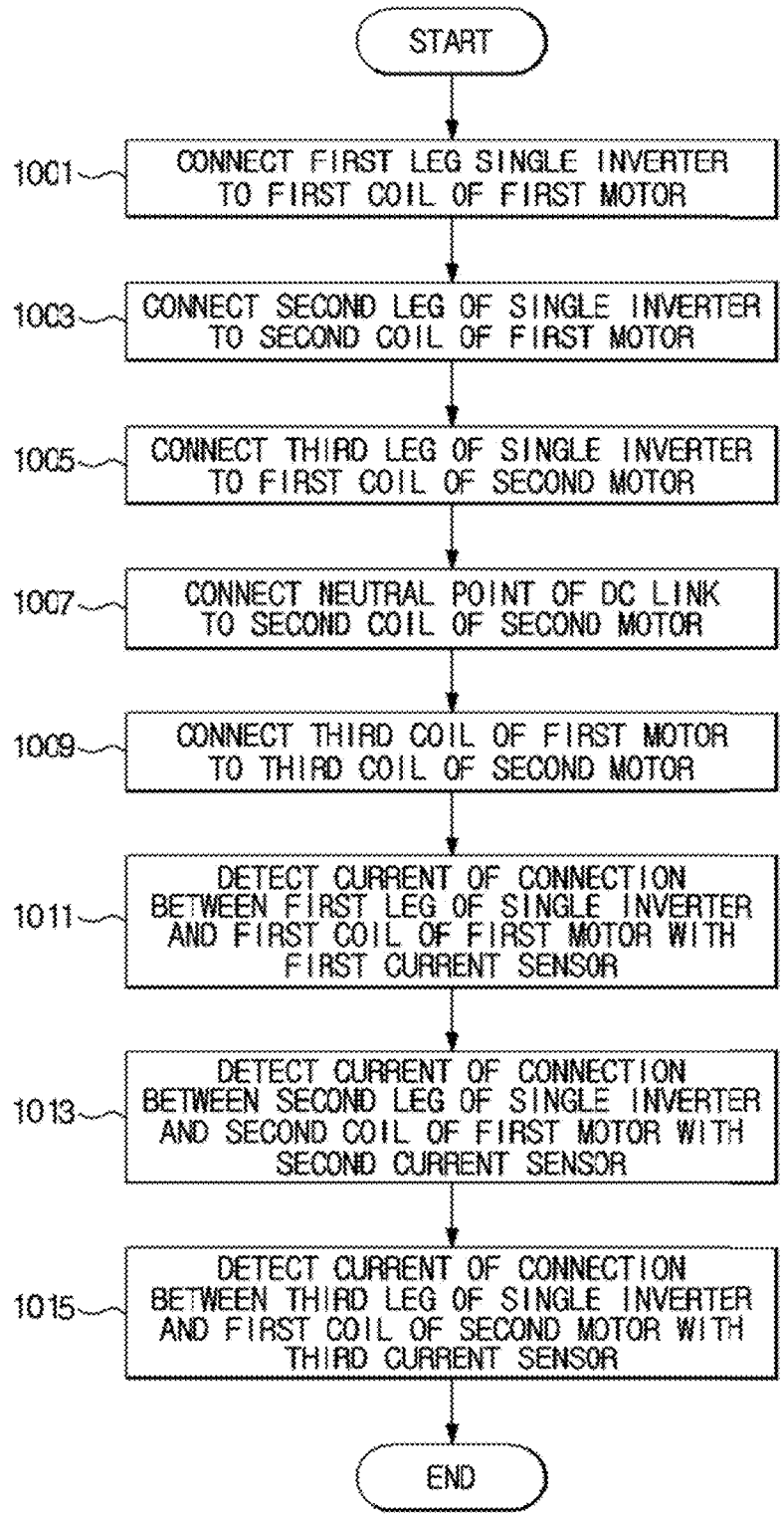
FIG. 10 is a flowchart of a method of connecting a power conversion apparatus to a plurality of motors to supply power to the motors, according to an exemplary embodiment.

FIG. 10 is a flowchart of a method of connecting a power conversion apparatus to a plurality of motors to supply power to the motors, according to an exemplary embodiment. The plurality of motors may include a first motor and a second motor.

As also described above with reference to FIGS. 1 through 9, a connection method may be used to connect the power conversion apparatus to the first motor and the second motor to supply power from to the first motor and the second motor. The power conversion apparatus may be provided with a DC link and a single inverter as described above with reference to FIGS. 1 through 9.

According to an exemplary embodiment, In operation 1001, a first leg of the single inverter may be connected to a first coil of the first motor. In operation 1003, a second leg of the single inverter may be connected to a second coil of the first motor. In operation 1005, a third leg of the single inverter may be connected to the first coil of the second motor. In operation 1007, a neutral point of the DC link may be connected to the second coil of the second motor. In operation 1009, a third coil of the first motor may be connected to a third coil of the second motor.

In operation 1011 of the connection method, current applied through the connection between the first leg of the single inverter and the first coil of the first motor may be detected by a first current sensor. In operation 1013, current applied through the connection between the second leg of the single inverter and the second coil of the first motor may be detected by a second current sensor. In operation 1015, current applied through the connection between the third lea of the single inverter and the first coil of the second motor may be detected by a third current sensor.

Figure 11:
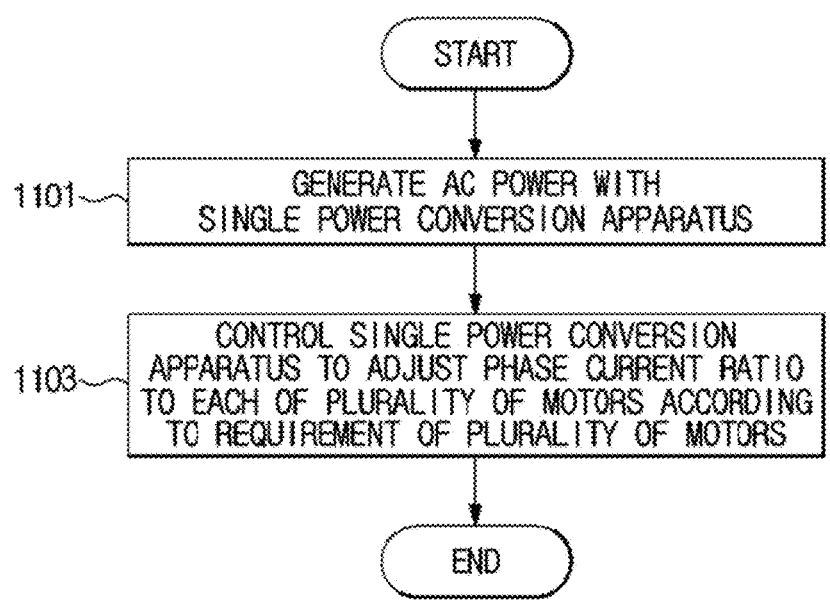
FIG. 11 is a flowchart of a method of driving a motor, according to an exemplary embodiment.

FIG. 11 is a flowchart of a method of driving a plurality of motors using a single power conversion apparatus, according to an exemplary embodiment.

In operation 1101, a single power conversion apparatus is used to generate AC power. In operation 1103, the single power conversion apparatus is controlled to adjust the phase current ratio supplied from a single power conversion apparatus to each of a plurality of motors according to a power requirement of each of the plurality of motors, which are driven by receiving the generated AC power from the power conversion apparatus.

Figure 12:
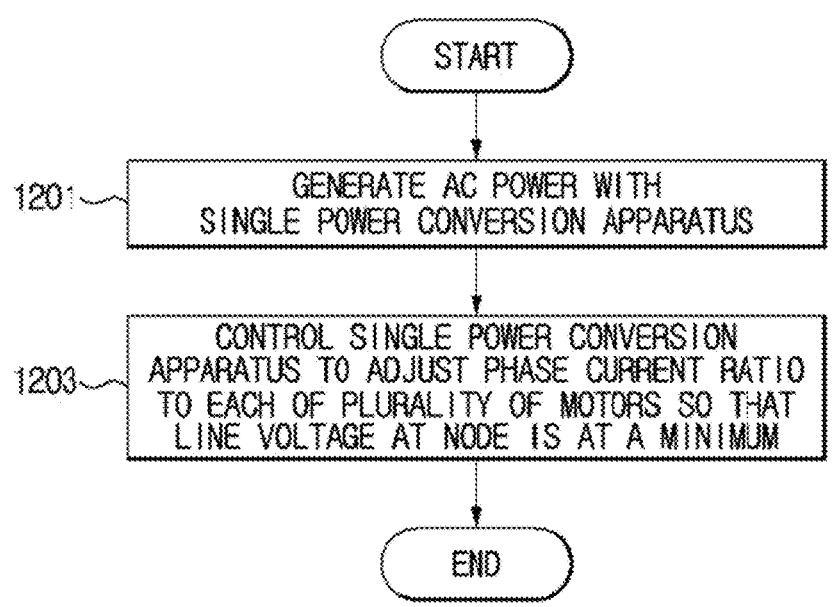
FIG. 12 is a flowchart of another method of driving a motor according to an exemplary embodiment.

FIG. 12 is a flowchart of a method of driving a plurality of motors using a single power conversion apparatus, according to an exemplary embodiment.

In operation 1201, a single power conversion apparatus is used to generate AC power. In operation 1203, the power conversion apparatus is controlled to adjust a phase current ratio supplied from the single power conversion apparatus so that line voltage at a node, at which the single power conversion apparatus and the plurality of motors are connected, is at a minimum.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the apparatuses described herein.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A motor driving apparatus comprising:
a single power conversion apparatus configured to supply power to a plurality of motors including a single inverter configured to convert a provided Direct Current (DC) power to an Alternating Current (AC) power required by the plurality of motors and a DC link provided with a neutral point to provide the DC power to the single inverter; and
a control apparatus configured to control the single power conversion apparatus to adjust a phase current ratio supplied to the plurality of motors from the single power conversion apparatus according to an amount of current required by each of the plurality of motors,
wherein a first leg of the single inverter is connected to a first coil of a first motor of the plurality of motors, a second leg of the single inverter is connected to a second coil of the first motor, a third coil of the first motor is connected to a third coil of a second motor of the plurality of motors, and a third leg of the single inverter is connected to a first coil of the second motor, and the neutral point of the DC link is connected to a second coil of the second motor.

2. The motor driving apparatus of claim 1, further comprising:
a first current sensor configured to detect current applied through connection between the first leg of the single inverter and the first coil of the first motor, a second current sensor configured to detect current applied through connection between the second leg of the single inverter and the second coil of the first motor, and a third current sensor configured to detect current applied through connection between the third leg of the single inverter and the first coil of the second motor.

3. The motor driving apparatus of claim 1 wherein:
the control apparatus is configured to generate a modified current command to control the power conversion apparatus to adjust the phase current ratio supplied to each of the plurality of motors from the single power conversion apparatus.

4. The motor driving apparatus of claim 3 wherein:
the generation of the modified current command comprises modifying the current command to adjust the phase current ratio applied to each of the plurality of motors according to the requirement by the plurality of motors so that an amount of current required by each of the plurality of motors is applied to the each of the plurality of motors.

5. The motor driving apparatus of claim 4 wherein:
voltage vA, vB, vC applied to the plurality of motors by the modified current command is expressed as below:

$$v_A = (i^*_{c2}k_1 + i^*_{c1}k_2 + 4i^*_{a1} + 3i^*_{b1} + i^*_{a2} + 3i^*_{c2})Z \quad \text{[Formula 1]}$$

$$v_B = (-i^*_{c2}k_1 + i^*_{c1}k_2 + 3i^*_{a1} + 4i^*_{b1} + i^*_{a2} + 4i^*_{c2})Z \quad \text{[Formula 2]}$$

$$v_C = (0 \cdot k_1 + 2i^*_{c1}k_2 + i^*_{a1} + i^*_{b1} + 2i^*_{a2} + i^*_{c2})Z \quad \text{[Formula 3]}$$

wherein in Formulas 1, 2, and 3, ia1*, ib1*, ic1*, ia2*, ib2*, ic2* represents the abc current command converted from the dq current command by coordinate transformation, k1 and k2 represents the phase current ratio applied to each of the plurality of motors, and Z represents stator impedance of the plurality of motors.

6. A motor driving apparatus comprising:
a single power conversion apparatus configured to supply power to a plurality of motors including a single inverter configured to convert a provided Direct Current (DC) power to an Alternating Current (AC) power required by the plurality of motors and a DC link provided with a neutral point to provide the DC power to the single inverter; and
a control apparatus configured to control the single power conversion apparatus to adjust a phase current ratio supplied from the single power conversion apparatus to each of the plurality of motors so that line voltage at least at one of a plurality of nodes at which the single power conversion apparatus and at least one of the plurality of motors are connected is at a minimum, wherein a first leg of the single inverter is connected to a first coil of a first motor of the plurality of motors, a second leg of the single inverter is connected to a second coil of the first motor, a third coil of the first motor is connected to a third coil of a second motor of the plurality of motors, and a third leg of the single inverter is connected to a first coil of the second motor, and the neutral point of the DC link is connected to a second coil of the second motor.

7. The motor driving apparatus of claim 6, further comprising:
a first current sensor configured to detect current applied through connection between the first leg of the single inverter and the first coil of the first motor, a second current sensor configured to detect current applied through connection between the second leg of the single inverter and the second coil of the first motor, and a third current sensor configured to detect current applied through connection between the third leg of the single inverter and the first coil of the second motor.

8. The motor driving apparatus of claim 6 wherein:
the control apparatus is configured to generate modified current command to control the power conversion apparatus to adjust the phase current ratio supplied to each of the plurality of motors from the single power conversion apparatus.

9. The motor driving apparatus of claim 8 wherein:
the generation of the modified current command comprises modifying the current command to adjust the phase current ratio applied to each of the plurality of motors according to the requirement by the plurality of motors so that an amount of current required by each of the plurality of motors is applied to the each of the plurality of motors.

10. The motor driving apparatus of claim 9 wherein:
voltage vA, vB, vC applied to the first leg, the second leg, and the third leg by the modified current command is expressed as below:

$$v_A = (i^*_{c2}k_1 + i^*_{c1}k_2 + 4i^*_{a1} + 3i^*_{b1} + i^*_{a2} + 3i^*_{c2})Z \quad \text{[Formula 1]}$$

$$v_B = (-i^*_{c2}k_1 + i^*_{c1}k_2 + 3i^*_{a1} + 4i^*_{b1} + i^*_{a2} + 4i^*_{c2})Z \quad \text{[Formula 2]}$$

$$v_C = (0 \cdot k_1 + 2i^*_{c1}k_2 + i^*_{a1} + i^*_{b1} + 2i^*_{a2} + i^*_{c2})Z \quad \text{[Formula 3]}$$

wherein in Formulas 1, 2, and 3, ia1*, ib1*, ic1*, ia2*, ib2*, ic2* represents the abc current command converted from the dq current command by coordinate transformation, k1 and k2 represents phase current ratio applied to each of the plurality of motors, and Z represents stator impedance of the plurality of motors.

11. The motor driving apparatus of claim 9 wherein:
voltage vA, vB, vC are represented as a time function expressed in Formulas 6, 7, and 8:

$$v_{AN} = 4(i^*_{a1} + k_1 i^*_{c2})Z + 3(i^*_{b1} + (1-k_1)i^*_{c2})Z + \quad \text{[Formula 6]}$$
$$(i^*_{a2} + k_2 i^*_{c1})Z$$
$$= I_1|Z_1|\cos(w_1 t + \phi_1) + (k_2 - 3)I_1|Z_1|$$
$$\cos(w_1 t + \phi_1 + 2\pi/3) +$$
$$I_2|Z_2|\cos(w_2 t + \phi_2) + (k_1 + 3)I_2|Z_2|$$
$$\cos(w_2 t + \phi_2 + 2\pi/3)$$

$$v_{BN} = 3(i^*_{a1} + k_1 i^*_{c2})Z + 4(i_{b1} + (1-k_1)i^*_{c2})Z + \quad \text{[Formula 7]}$$
$$(i^*_{a2} + k_2 i^*_{c1})Z$$
$$= I_1|Z_1|\cos(w_1 t + \phi_1 - 2\pi/3) +$$
$$(k_2 - 3)I_1|Z_1|\cos(w_1 t + \phi_1 + 2\pi/3) +$$
$$I_2|Z_2|\cos(w_2 t + \phi_2) + (4 - k_1)I_2|Z_2|$$
$$\cos(w_2 t + \phi_2 + 2\pi/3)$$

$$v_{CN} = (i^*_{a1} + k_1 i^*_{c2})Z + (i^*_{b1} + (1-k_1)i^*_{c2})Z + \quad \text{[Formula 8]}$$
$$2(i^*_{a2} + k_2 i^*_{c1})Z$$
$$= (2k_2 - 1)I_1|Z_1|\cos(w_1 t + \phi_1 + 2\pi/3) +$$
$$I_2|Z_2|\cos(w_2 t + \phi_2) - I_2|Z_2|\cos$$
$$(w_2 t + \phi_2 - 2\pi/3)$$

wherein in Formulas 6, 7 and 8, vAN, vBN, vCN represent line voltages of a node to the single inverter and at least one of the plurality of motors are connected, Z represents a stator impedance of the plurality of motors, |Z| represents the size of Z, φ represents a Phase of Z, t represents a time, ω1 and ω2 represent rotating frequencies, I1 and I2 represent an amount of current determined by a torque of a respective motor of the plurality of motors, k1 and k2 represents phase current ratio applied to each of the plurality of motors, and ia1*, ib1*, ic1*, ia2*, ib2*, and ic2* represent an abc current command generated by coordinate conversion so that each of the three-phases are balanced.

12. A motor driving apparatus comprising:
a single power conversion apparatus configured to supply power to a plurality of motors, wherein the single power conversion apparatus comprises a Direct Current (DC) link provided with a neutral point; and
a control apparatus configured to control the single power conversion apparatus to adjust a phase current ratio supplied from the single power conversion apparatus to each of the plurality of motors so that line voltage at least at one of a plurality of nodes at which the single power conversion apparatus and at least one of the plurality of motors are connected is at a minimum, wherein a first leg of the single inverter is connected to a first coil of a first motor, a second leg of the single inverter is connected to a second coil of the first motor, a third leg of the single inverter is connected to the first coil of a second motor, the neutral point of the DC link is connected to a second coil of the second motor, and a third coil of the first motor is connected to a third coil of the second motor.

13. A method of connecting a power conversion apparatus provided with a DC link and a single inverter to a first motor and a second motor to supply power from the power conversion apparatus to the first motor and the second motor, the method comprising:
connecting a first leg of the single inverter to a first coil of the first motor;
connecting a second leg of the single inverter to a second coil of the first motor;
connecting a third leg of the single inverter to the first coil of the second motor;
connecting a neutral point of the DC link to the second coil of the second motor; and
connecting a third coil of the first motor to a third coil of the second motor.

14. The connection method of claim 13, wherein:
current applied through connection between the first leg of the single inverter and the first coil of the first motor is detected by a first current sensor, current applied through connection between the second leg of the single inverter and the second coil of the first motor is detected by a second current sensor, and current applied through connection between the third leg of the single inverter and the first coil of the second motor is detected by a third current sensor.

15. A method of driving a plurality of motors using a single power conversion apparatus, the method comprising:
converting a provided Direct Current (DC) power to an Alternating Current (AC) power required by the plurality of motors with a single inverter of the single power conversion apparatus including a DC link with a neutral point to provide the DC power to the single inverter; and
controlling the single power conversion apparatus to adjust a phase current ratio supplied from the single power conversion apparatus to each of the plurality of motors according to an amount of current required by each of the plurality of motors which are driven by receiving the generated AC power from the power conversion apparatus,
wherein a first leg of the single inverter is connected to a first coil of a first motor of the plurality of motors, a second leg of the single inverter is connected to a second coil of the first motor, a third coil of the first motor is connected to a third coil of a second motor of the plurality of motors, and a third leg of the single inverter is connected to a first coil of the second motor, and the neutral point of the DC link is connected to a second coil of the second motor.

16. A method of driving a plurality of motors using a single power conversion apparatus, the method comprising:
converting a provided Direct Current (DC) power to an Alternating Current (AC) power required by the plurality of motors with a single inverter of the single power conversion apparatus including a DC link with a neutral point to provide the DC power to the single inverter; and
controlling the single power conversion apparatus to adjust a phase current ratio supplied from the single power conversion apparatus so that line voltage at least at one of the plurality of nodes, at which the single power conversion apparatus and at least one of the plurality of motors are connected, is at a minimum,
wherein a first leg of the single inverter is connected to a first coil of a first motor of the plurality of motors, a second leg of the single inverter is connected to a second coil of the first motor, a third coil of the first motor is connected to a third coil of a second motor of the plurality of motors, and a third leg of the single inverter is connected to a first coil of the second motor, and the neutral point of the DC link is connected to a second coil of the second motor.

* * * * *